US008371596B2

(12) United States Patent
Johnson et al.

(10) Patent No.: US 8,371,596 B2
(45) Date of Patent: Feb. 12, 2013

(54) SUSPENSION SYSTEM FOR HEAVY AND VOCATIONAL VEHICLES

(75) Inventors: Marc Johnson, Muskegon, MI (US); Mark Molitor, Muskegon, MI (US); Jeffrey Michael Galla, Muskegon, MI (US); Jason Klein, Muskegon, MI (US); David Roe, Grand Haven, MI (US); Daniel R. Dykstra, Grand Rapids, MI (US)

(73) Assignee: Saf-Holland, Inc., Holland, MI (US)

( * ) Notice: Subject to any disclaimer, the term of this patent is extended or adjusted under 35 U.S.C. 154(b) by 197 days.

(21) Appl. No.: 12/778,888

(22) Filed: May 12, 2010

(65) Prior Publication Data

US 2011/0115184 A1    May 19, 2011

Related U.S. Application Data

(60) Provisional application No. 61/177,874, filed on May 13, 2009.

(51) Int. Cl.
| | |
|---|---|
| *B60G 9/02* | (2006.01) |
| *B60G 11/64* | (2006.01) |
| *B60G 7/04* | (2006.01) |
| *B60G 21/05* | (2006.01) |

(52) U.S. Cl. ... 280/124.116; 280/124.157; 280/124.166; 280/788

(58) Field of Classification Search ........... 280/124.116, 280/124.111, 124.128, 124.129, 124.132, 280/124.106, 124.107, 124.11, 124.152, 280/124.156, 124.131, 124.157, 124.166, 280/788; 267/52

See application file for complete search history.

(56) References Cited

U.S. PATENT DOCUMENTS

| 3,921,999 | A  | * | 11/1975 | Masser ...................... 280/676 |
| 4,273,357 | A  | * | 6/1981  | Pashkow ................ 280/124.116 |
| 5,039,124 | A  | * | 8/1991  | Widmer ................. 280/124.116 |
| 5,328,159 | A  | * | 7/1994  | Kaufman et al. ............... 267/52 |
| 5,649,719 | A  | * | 7/1997  | Wallace et al. ........ 280/124.156 |
| 6,276,710 | B1 | * | 8/2001  | Sutton ........................... 280/678 |
| 6,290,244 | B1 | * | 9/2001  | Hosoya ................. 280/124.157 |
| 6,328,322 | B1 | * | 12/2001 | Pierce ................... 280/124.131 |
| 6,702,325 | B1 | * | 3/2004  | Pierce ........................... 280/788 |
| 6,808,192 | B1 | * | 10/2004 | Bol ....................... 280/124.116 |
| 7,178,817 | B1 | * | 2/2007  | Welles et al. .......... 280/124.128 |
| 2004/0007845 | A1 | * | 1/2004 | Reineck ................ 280/124.107 |
| 2004/0021290 | A1 | * | 2/2004 | Hicks et al. ................ 280/438.1 |
| 2006/0049600 | A1 | * | 3/2006 | Dudding et al. ......... 280/124.11 |
| 2006/0076750 | A1 | * | 4/2006 | Sundgren et al. ...... 280/124.107 |
| 2006/0255557 | A1 | * | 11/2006 | Hass et al. ............. 280/124.116 |

* cited by examiner

*Primary Examiner* — Paul N Dickson
*Assistant Examiner* — Keith Frisby
(74) *Attorney, Agent, or Firm* — Price Heneveld LLP

(57) ABSTRACT

A vehicle suspension system includes a first trailing arm assembly and a second trailing assembly each including a mounting bracket adapted to be secured to a vehicle frame and a trailing arm member pivotably coupled to the associated mounting bracket and adapted to be operably coupled to an axle member, wherein the trailing arm members each include an aperture extending therein, wherein the aperture has a relatively constant cross-sectional configuration along a depth thereof. The vehicle suspension system further includes a torsional member extending between the first and second trailing arm members and frictionally secured within the apertures thereof, wherein the torsional member has a relatively constant cross-sectional configuration along a length thereof that is received within the apertures of the trailing arms.

9 Claims, 8 Drawing Sheets

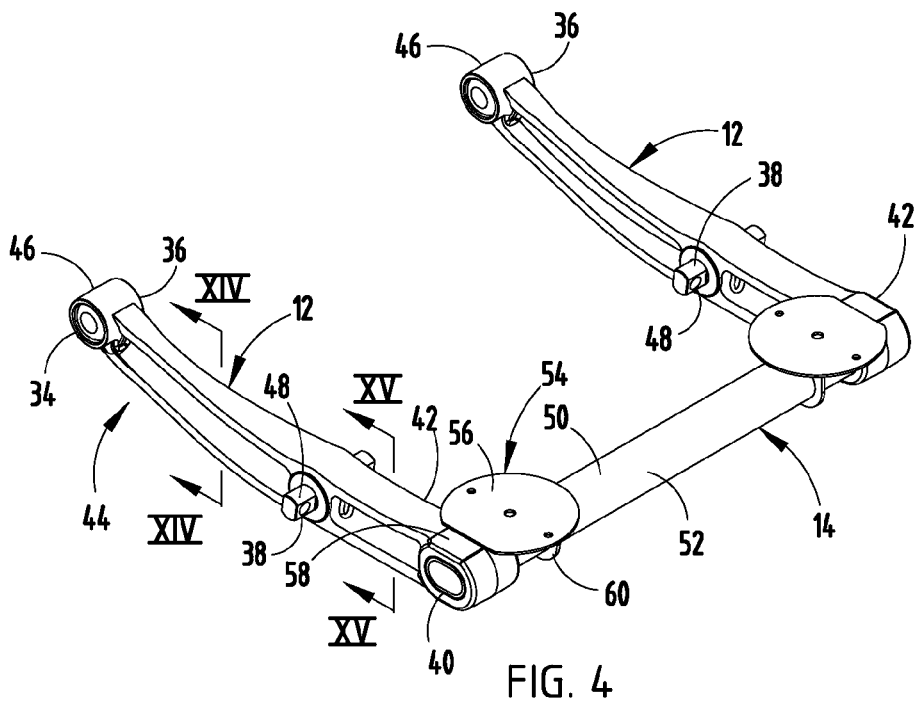
FIG. 4
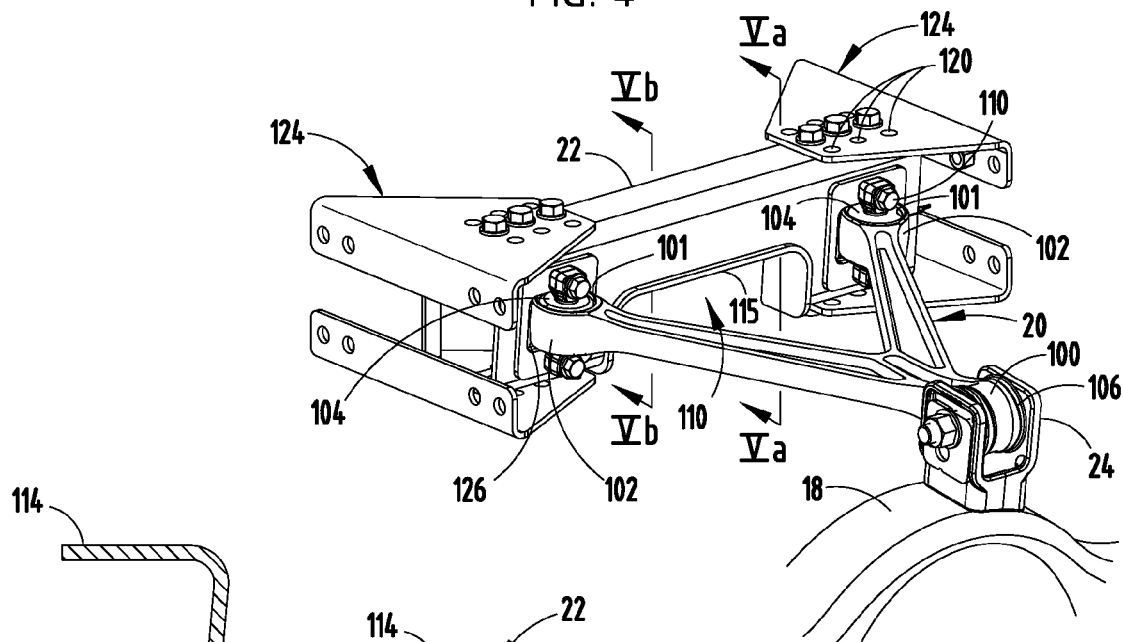
FIG. 5
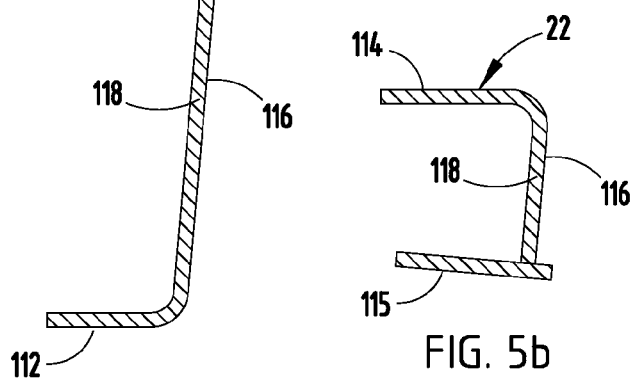
FIG. 5a
FIG. 5b

SUSPENSION SYSTEM FOR HEAVY AND VOCATIONAL VEHICLES

CROSS-REFERENCE TO RELATED APPLICATION

This application claims priority to U.S. Provisional Patent Application No. 61/177,874 filed May 13, 2009, entitled SUSPENSION SYSTEM FOR HEAVY AND VOCATIONAL VEHICLES, the specification of which is hereby incorporated in its entirety.

BACKGROUND OF THE INVENTION

1. Field of the Invention

The present invention relates to a drive axle suspension system for heavy vehicles which has been optimized for reduced weight, reduced part count and increased durability.

2. Technical Background

Various suspension systems utilizing air springs have been developed for semi-tractor trailers and other heavy vehicles. These systems are typically designed to control the position of the chassis relative to an associated axle and to cushion any movement of the axle with respect to the chassis frame. Although these systems provide excellent chassis control over a wide range of loading conditions, conventional air spring systems typically do not offer acceptable resistance to vehicle roll, as is often experienced when the vehicle turns, nor do they offer acceptable resistance to lateral shifting of the vehicle.

While specialized components have been added to air spring systems to reduce roll and lateral shift, many of these components add significant weight and cost and maintenance to the associated suspension system without greatly reducing the roll and lateral shift. Specifically, these designs typically incorporate single-piece trailing arms that require materials meeting torsional and sheer strength requirements, but that also may be tapped and threaded as required. Further, many of these components include complicated designs that are not only expensive to manufacture, but are also difficult to install or replace should damage to the component or related equipment occur. One particular assembly is adapted to stabilize the related suspension system by securing a torsional beam between a pair of trailing arms by bolts that extend through the torsional beam and into threaded apertures located in the ends of the beams. This particular assembly requires large securing bolts adapted to withstand significant torsional and sheering forces, and further requires the replacement or retapping of a trailing arm should the threads within the bolt receiving aperture become damaged or worn as well as maintenance burden.

There is a need for a lightweight and inexpensive air spring suspension system that resists roll and lateral shift, will not significantly impact the ride-cushioning characteristics of such suspension system, provides a relative increase of structural integrity, and that can further be maintained and repaired quickly and cost-effectively.

SUMMARY OF THE INVENTION

One aspect of the present invention is a vehicle suspension system that comprises a first trailing arm assembly that comprises a first mounting bracket adapted to be secured to a vehicle frame, and a first trailing arm member pivotably coupled to the first mounting bracket and adapted to be operably coupled to an axle member, wherein the first trailing arm member includes a first aperture extending therein, and wherein the first aperture has a relatively constant cross-sectional configuration along a depth thereof. The vehicle suspension system further comprises a second trailing arm assembly that comprises a second mounting bracket adapted to be secured to a vehicle frame, and second trailing arm member pivotably coupled to the second mounting bracket and adapted to be operably coupled to an axle member, wherein the second trailing arm member includes a second aperture extending therein, and wherein the second aperture has a relatively constant cross-sectional configuration along a depth thereof. The vehicle suspension system still further includes a torsional member extending between the first trailing arm member and the second trailing arm member and secured within the first aperture and the second aperture, wherein the torsional member has a relatively constant cross-sectional configuration along a length thereof that is received within the first and second apertures. Another aspect of the present invention is a vehicle suspension system that comprises a first trailing arm assembly that comprises a first mounting bracket adapted to be secured to a vehicle frame, and a first trailing arm member pivotably coupled to the first mounting bracket and adapted to be operably coupled to an axle member, and a second trailing arm assembly comprising a second mounting bracket adapted to be secured to a vehicle frame, and a second trailing arm member pivotably coupled to the second mounting bracket and adapted to the operably coupled to an axle member. The vehicle suspension system further comprises a torsional member extending between the first trailing arm member and the second trailing arm member and secured to the first trailing arm member and the second trailing arm member, wherein the torsional member includes a substantially oval-shaped cross-sectional configuration, and wherein the torsional member includes a pair of substantially flat portions extending along a length of the torsional member, and a pair of substantially arcuate portions extending along a length of the torsional member and inner spaced with the substantially flat portions.

Yet another aspect of the present invention is a vehicle suspension system that comprises a first mounting bracket adapted to be secured to a vehicle frame, a trailing arm member pivotably coupled to the first mounting bracket and adapted to be operably coupled to an axle member, a torsional member operably coupled to the trailing arm member, a spring assembly adapted to operably support a vehicle frame from the trailing arm, and a spring assembly mount including a first portion having an aperture therein that receives the torsional member therethrough, and a second portion coupled to the first portion and adapted to support the spring assembly thereon.

Still yet another aspect of the present invention is a vehicle suspension system that comprises a first trailing arm assembly that comprises a first mounting bracket adapted to be secured to a vehicle frame, and a first trailing arm member that includes a first end, a second end and an intermediate location located between the first end and the second end, wherein the first trailing arm member is pivotably coupled to the first mounting bracket at the first end of the first trailing arm, the first trailing member is adapted to be operably coupled to an axle member, and wherein a cross-sectional area of the trailing arm member at a position proximate a first end is less than a cross-sectional area of the trailing arm member at a position proximate the intermediate location. The vehicle suspension system further comprises a second trailing arm assembly that comprises a second mounting bracket adapted to be secured to a vehicle frame, and a second trailing arm member including a first end, a second end and an intermediate location located between the first end and the second end, wherein the second trailing arm member is pivotably coupled to the second mounting bracket at the first end of the second trailing arm, the second trailing arm member is adapted to be operably coupled to an axle member, and wherein a cross-sectional area of the second trailing arm member at a position proximate the first end of the second trailing arm member is less than a cross-sectional area of the second trailing arm member at a position proximate the intermediate location of the second trailing arm member, the vehicle suspension system further comprises a torsional member extending between the first trailing arm member and the second trailing arm member and secured to the first and second trailing arm members.

Yet another aspect of the present invention is a vehicle suspension system that comprises a first mounting bracket adapted to be secured to a vehicle frame member, a first trailing arm member pivotably coupled to the first mounting bracket, a second mounting bracket adapted to be secured to a vehicle frame, a second trailing arm member pivotably coupled to the second mounting bracket, and an axle member extending between the first and second trailing arm members. The vehicle suspension system further comprises a first axle mounting assembly securing the axle member to the first trailing arm member, and a second axle mounting assembly securing the axle member to the second trailing arm member, wherein at least one of the first axle mounting assembly and the second axle mounting assembly includes an upwardly-disposed, curved abutment surface. The vehicle suspension system still further includes a stop member adapted to be operably coupled to a vehicle frame, the stop member including a downwardly-disposed, curved abutment surface adapted to abut the abutment surface of the axle mounting assembly, thereby limiting the travel of at least a select one of the first trailing arm member and the second trailing arm member with respect to a vehicle frame.

Still yet another aspect of the present invention is a vehicle suspension system that comprises a first mounting bracket adapted to be secured to a vehicle frame, a first trailing arm member pivotably coupled to the first mounting bracket, a second mounting bracket adapted to be secured to a vehicle frame, a second trailing arm member pivotably coupled to the second mounting bracket, and an axle extending between the first and second trailing arm members. The vehicle suspension system further comprises an upwardly-disposed, curved first stop surface fixed for movement with the axle member, and a downwardly-disposed, curved second stop surface adapted to be fixed for movement with respect to a vehicle frame, and adapted to abut the first stop surface, thereby limiting travel at least a select one of the first trailing arm member and the second trailing arm member with respect to a vehicle frame.

These and other advantages of the invention will be further understood and appreciated by those skilled in the art by reference to the following written specification, claims and appended drawings.

BRIEF DESCRIPTION OF DRAWINGS

FIG. 4 is a perspective view of a lower control arm and a transverse beam assembly of the suspension;

FIG. 5 is a perspective view of a v-rod, a v-rod bracket and a frame cross member;

FIG. 5a is a cross-sectional view of the frame cross member taken along the line Va-Va, FIG. 5;

FIG. 5b is a cross-sectional view of the frame cross member taken along the line Vb-Vb, FIG. 5;

DETAILED DESCRIPTION OF PREFERRED EMBODIMENTS

Figure 1:
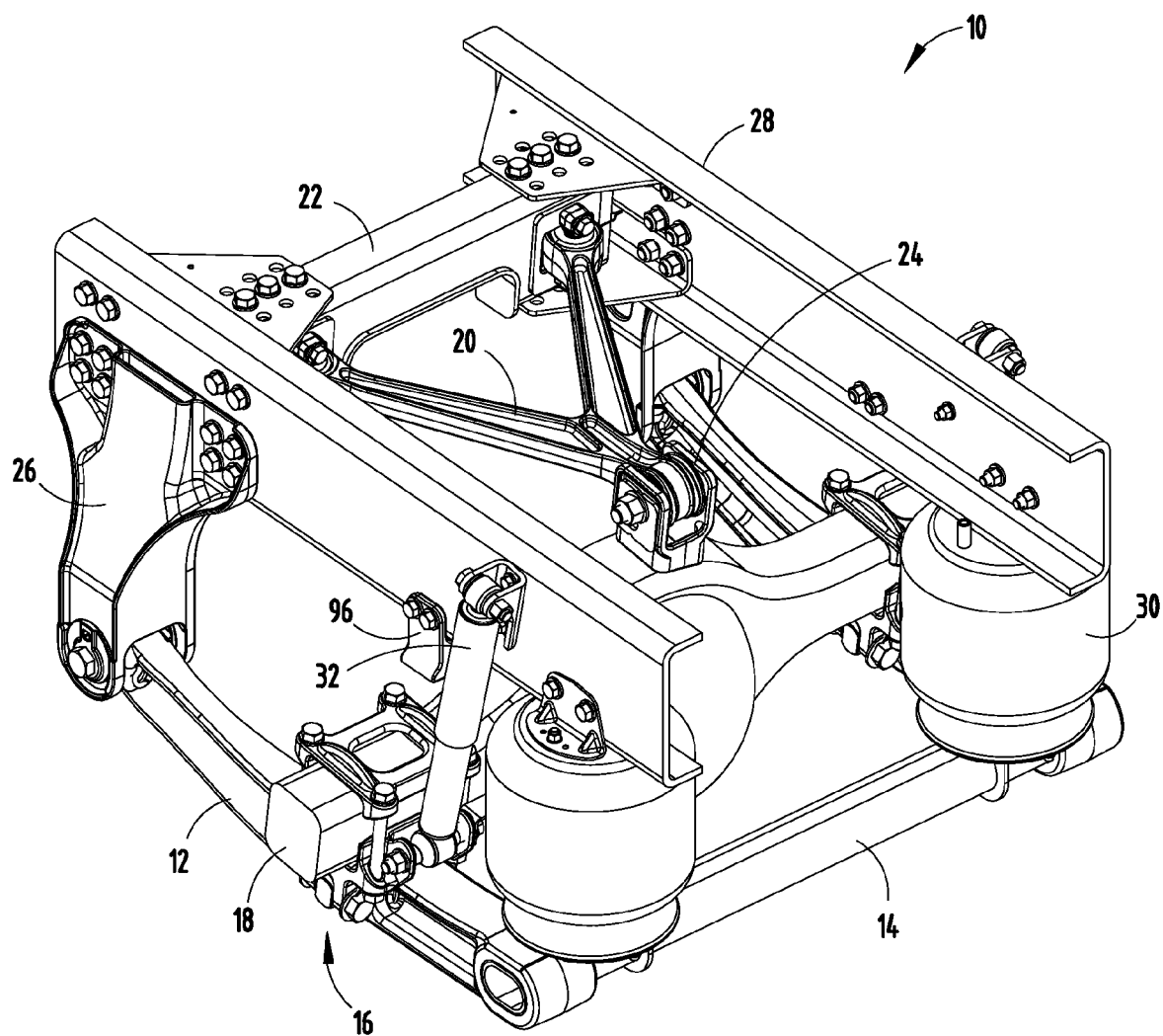
FIG. 1 is a perspective view of a suspension system embodying the present invention.
Figure 2:
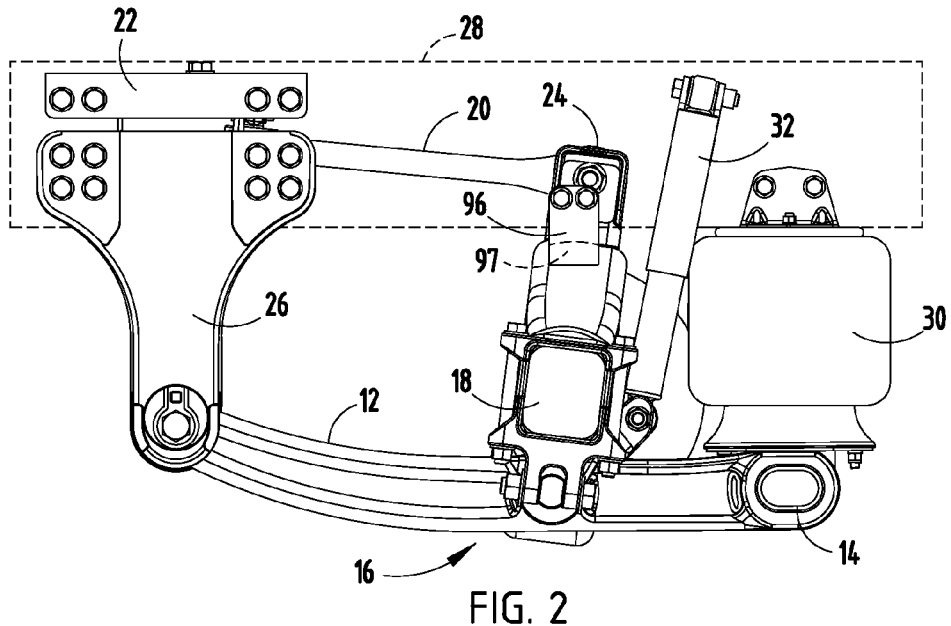
FIG. 2 is a side plan view of the suspension system.
Figure 3:
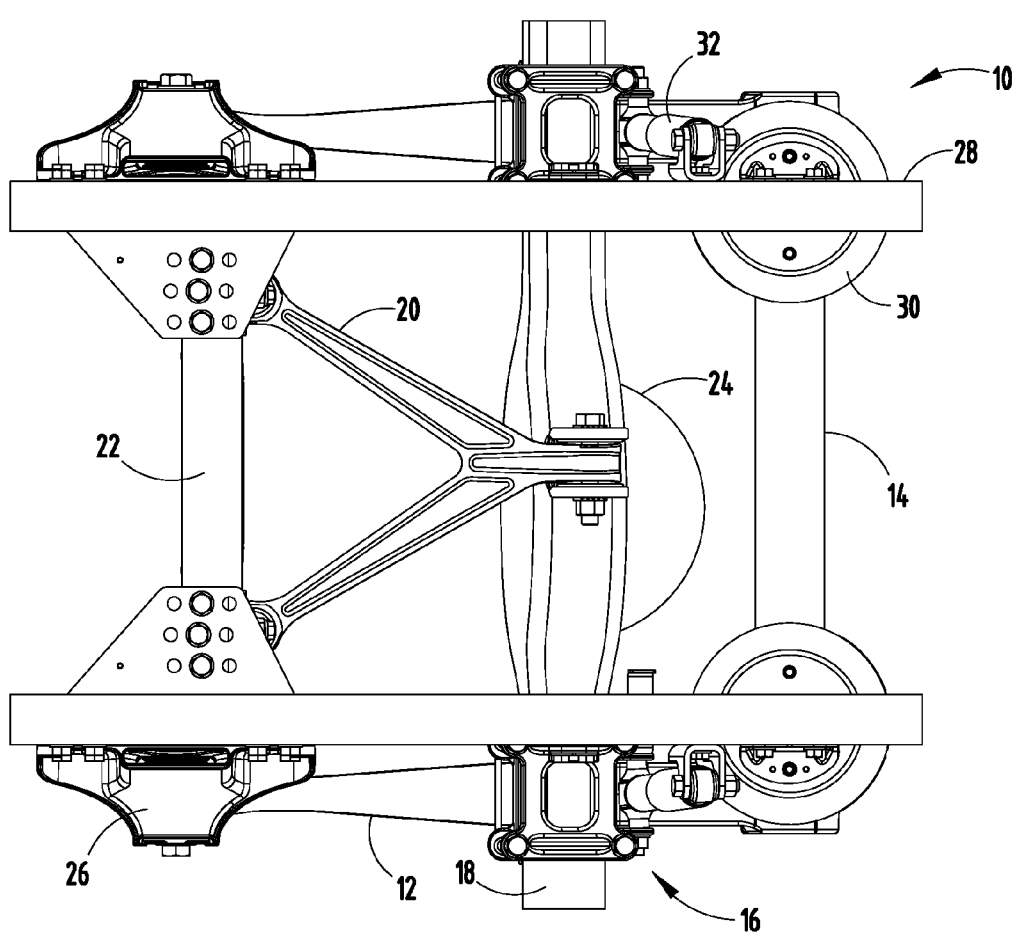
FIG. 3 is a top plan view of the suspension system.

For purposes of description herein, the terms "upper," "lower," "right," "left," "rear," "front," "vertical," "horizontal," and derivatives thereof shall relate to the invention as oriented in FIGS. 1-3. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

A suspension system 10 (FIGS. 1-3) is designed for heavy vehicle applications, which has a reduced weight and part count, and which is designed to be adapted to a full range of axle pinion angles. The suspension system 10 includes a pair of lower control arms 12 which are connected to a transverse beam 14, a system of attachment brackets 16 that connect a drive axle 18 to the lower control arms 12, an upper control arm or v-rod 20 that connects the axle 18 to a vehicle frame cross member 22, a bracket 24 connecting the v-rod 20 to the axle 18, a pair of mounting brackets 26 which attach the lower control arms 12 to a corresponding pair of vehicle frame members 28, air springs 30 and shock absorbers 32. The suspension system 10 creates a parallelogram geometry which minimizes the change in the axle pinion angle during articulation from full up to full down, as described below.

Figure 13:
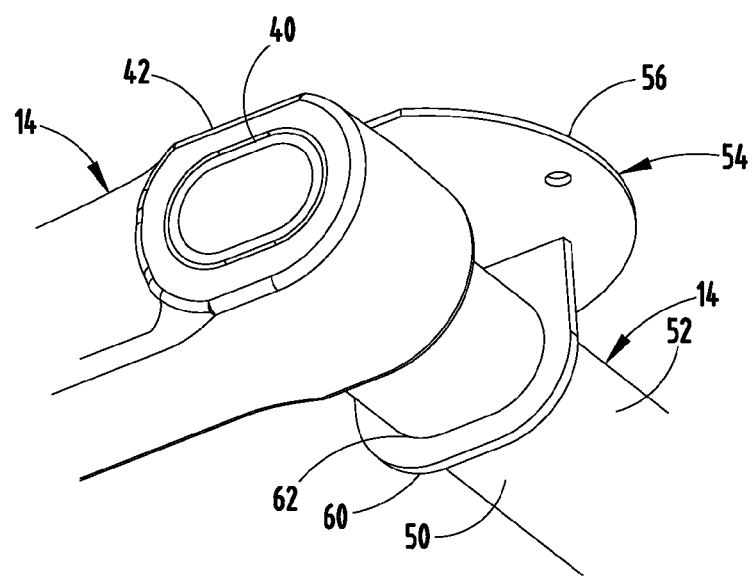
FIG. 13 is a detail perspective view of a lower control arm assembly and a transverse beam joint.

In the illustrated example, each lower control arm 12 (FIG. 4) comprises a cast beam with a round bushing receptacle 34 at a leading end 36 thereof, a second round bushing receptacle 38 positioned midway along length thereof, and an oval or 'double D' transverse beam receptacle 40 (FIG. 13) at a trailing end 42 thereof. Each lower control arm 12 includes a necked section 44 near the leading end 36 and which provides additional torsional compliance for vehicle roll. The necked section 44 also provides additional clearance for other vehicle systems such as brake components (not shown). The lower control arm 12 also includes a through bolt bushing 46 located in the bushing receptacle 34 at the leading end 36, and a bar-pin bushing 48 located in the bushing receptacle 38 positioned midway along the length thereof.

The transverse beam 14 comprises a high strength steel tube characterized by an oval or 'double D' cross section having a pair of longitudinally extending flat surfaces 50 equally spaced about the circumference of the transverse beam 14 with radiused surfaces 52. The oval cross section enhances the torque carrying capacity of the lower control arm assembly by converting torsional loads into compressive loads on the inside surface of the lower control arm transverse beam receptacle 40. The oval or 'double D' cross section also maximizes the radii of the inside of the receptacle 40 on the lower control arm 12 thereby minimizing the stresses on the lower control arm 12 due to torsional loading. The flat area 50 located on the top surface of the transverse beam 14 provides an anti-rotation feature for mounting the air spring support 54. The transverse beam 14 is relatively longer than that in previous suspension systems, thereby allowing greater torsional 'wind-up' and increasing axle articulation for a given stress state in the transverse beam 14. It is noted that although the illustrated example includes a transverse beam having an oval-shaped cross-sectional configuration, other non-related shapes may also be utilized.

In one embodiment, the connection between the lower control arm 12 and the transverse beam 14 is made in the manufacturing facility, is permanent, and does not require periodic service. The connection between the lower control arm 12 and the transverse beam 14 is characterized by the oval or 'double D' shape of the transverse beam 14 and the mating hole 40 in the lower control arm 12. This connection can be made by a variety of methods, including welding, shrink fit, press fit, post assembly expansion of the tube, post assembly compression of the beam, and the like, or any combination of these processes.

The permanent connection between the lower control arm 12 and the transverse beam 14 also provides a manner in which to capture the air spring support 54 to the transverse beam 14. In one embodiment, the air spring support 54 includes a semi-round plate 56 which is welded to the upper surface 58 of the lower control arm 12 and a gusset 60 with a cut out 62 which matches the cross section of the transverse beam 14. The gusset 60 and the semi-round plate 56 are welded together and slipped on to the transverse beam 14 at the time of assembly in the manufacturing facility. The semi-round plate 56 is then welded to the lower control arm 12. In another embodiment, the separately welded air spring mount may be eliminated by integrating the air spring mount into the lower control arm casting.

Figure 14:
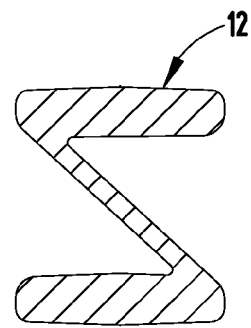
FIG. 14 is a cross-sectional view of a Z-shaped lower control arm, taken along the line XIV-XIV, FIG. 4.
Figure 15:
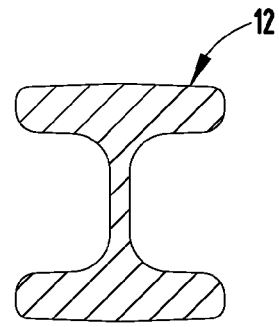
FIG. 15 is a cross-sectional view of an I-shaped lower control arm, taken along the line XV-XV, FIG. 4.

As best illustrated in FIG. 14, the lower control arm 12 may have a Z-shaped cross-sectional configuration in a forward portion and an I-shaped cross-sectional configuration in a rearward portion. This cross-sectional shape further optimizes size and weight of the beam for vehicle loads while retaining the ability to cast the bushing receptacles without complicated casting processes.

Figure 6:
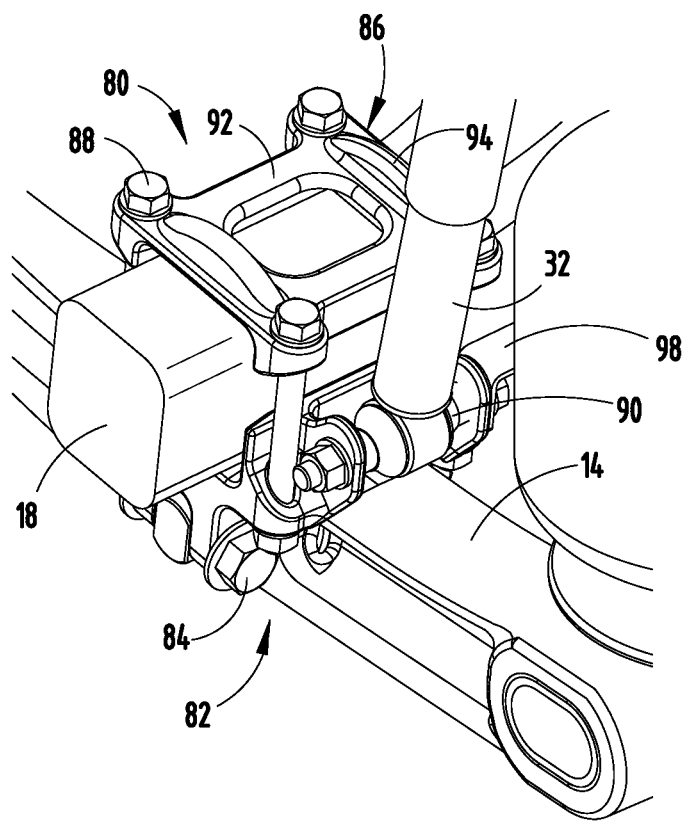
FIG. 6 is a perspective view of a bolt-on embodiment of an axle adapter bracket.
Figure 16:
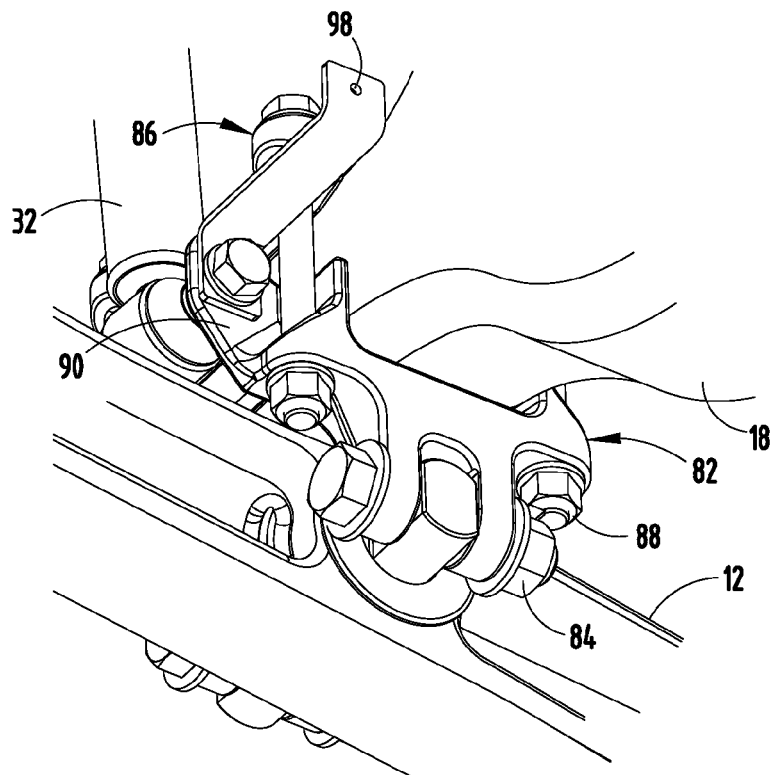
FIG. 16 is an enlarged perspective view of an axle adapter assembly including a height control valve connection tab.

As best illustrated in FIGS. 6 and 16, an axle adapter bracket 80 connects the lower control arm 12 to the axle 18 at the bushing receptacle 38 midway along the length of lower control arm 12. A lower portion 82 of the axle adapter bracket 80 connects to the bar-pin bushings 48 via a pair of bolts 84. An upper plate 86 of the axle adapter bracket 80 is clamped over the axle 18 and to the lower portion 82 via a plurality of bolts 88. The lower portion 82 of the axle adapter includes a pair of mounting flanges 90 which form a clevis for connecting the lower end of the shock absorber 32. The holes for mounting the shock absorber 32 may be drilled in several locations depending on the ride height and pinion angle of the suspension. An upper surface 92 of the upper plate 86 includes a pair of arched ribs 94 which maintain a consistent contact surface for the axle stop 96 (FIG. 1) regardless of axle pinion angle. The axle stop 96 is a casting which provides a consistent maximum up travel position for the axle 18. The axle stop 96 has a curved lower surface 97 which in conjunction with the arched ribs 94 of the axle adapter upper plate 96 creates a consistent travel limiter. The consistent axle stop allows the elimination of an internal bumper from the air spring, thereby reducing air spring component count, weight and overall cost. The shock absorber clevis also provides a mounting point for the suspension height control air valve mounting bracket 98.

Figure 7:
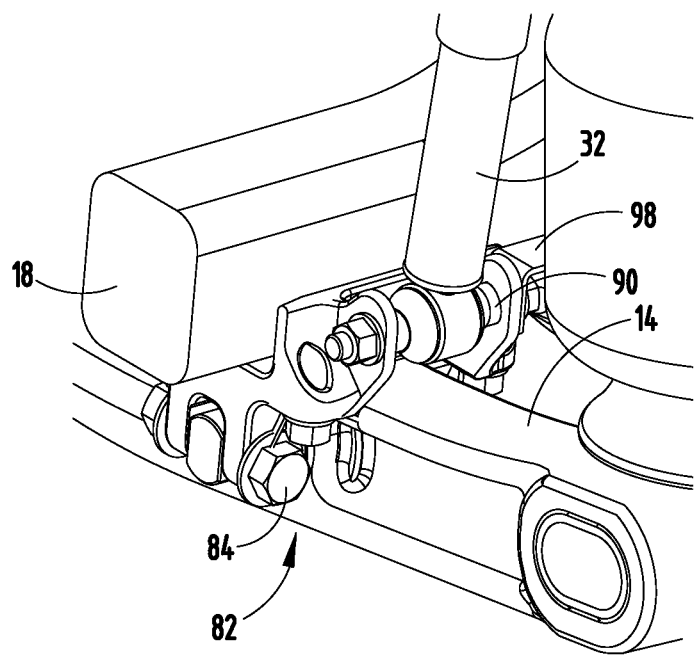
FIG. 7 is a perspective view of a weld-on embodiment of the axle adapter bracket.

In another embodiment, the lower portion 82 (FIG. 7) of the axle adaptor bracket 80 may be welded directly to the axle 18 thus eliminating the upper axle adapter plate 86 and the associated plurality of bolts 88.

Figure 20:
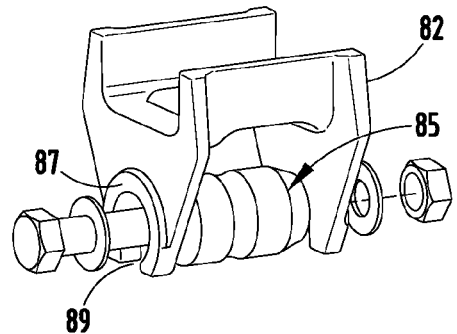
FIG. 20 is an exploded perspective view of an alternative embodiment of the axle adapter that includes a through bolt bushing connection.

In yet another embodiment, the axle adapter lower portion 82 (FIG. 20) is connected to a through bolt bushing 85 in the midway bushing receptacle 38 of the lower control arm 12 via a set of pucks 87 and slots 89 on the axle adapter casting 82 which significantly reduce the clearance required for a through bolt bushing at the axle.

The upper control arm or 'v-rod' 20 (FIG. 5) comprises a generally triangular cast assembly with one bushing receptacle (not shown) in the trailing end 100 thereof, and two bushing receptacles 101 in the forward end 102 thereof. The forward ends 102 are each bolted via bar-pin bushings 104 directly to the vehicle cross member 22. The trailing end 100 is bolted via a through bolt bushing 106 to the bracket 24 mounted to the top of the axle 18. The v-rod 20 is integrated to minimize the component count as compared to a typical combination torque rod and track rod. Since the v-rod system is symmetric about the vehicle center line, it also provides a symmetric roll characteristic versus a traditional torque rod and track rod system.

Figure 17:
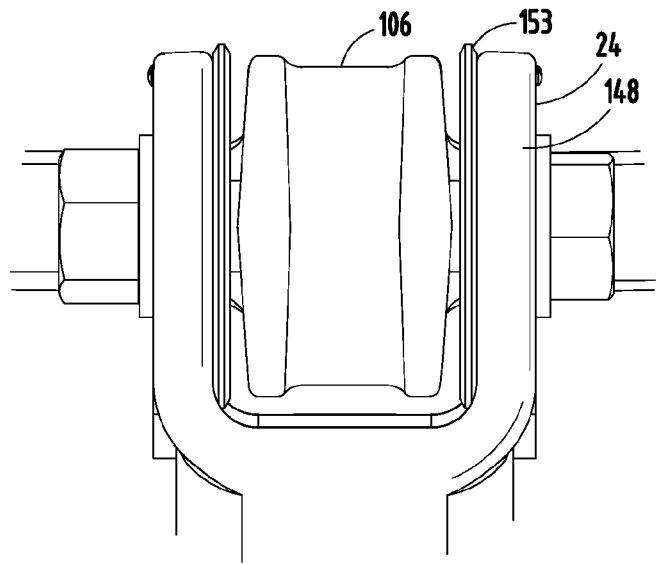
FIG. 17 is an enlarged rear view of a rear end of the v-rod and includes a casting draft allowing increased roll compliance.

The bar-pin bushings 104 at the forward end 102 provide ease of installation to the vehicle cross member 22 via two bolts per bushing 104, and an enhanced lateral stability due to the typical high bushing rate for radial bushing displacement. The bar-pin bushings 104 also provide a position to easily shim the suspension for small changes in axle pinion angle and alignment. As best illustrated in FIG. 17, the casting draft on the bushing receptacle is aligned to provide increased roll compliance. It is noted that the horizontal orientation of the through bolt bushing 106 at the trailing end 100 provides a low profile for enhanced axle travel. The through bolt also provides an interface for the v-rod bracket. The rear bushing 106 may also be provided as a vertical bar-pin bushing. Although the v-rod 20 is preferable cast, it may also be fabricated from stamped steel. Still further, the v-rod 20 may be assembled from two symmetric castings joined at the rear bushing thereby providing further roll compliance.

Figure 11:
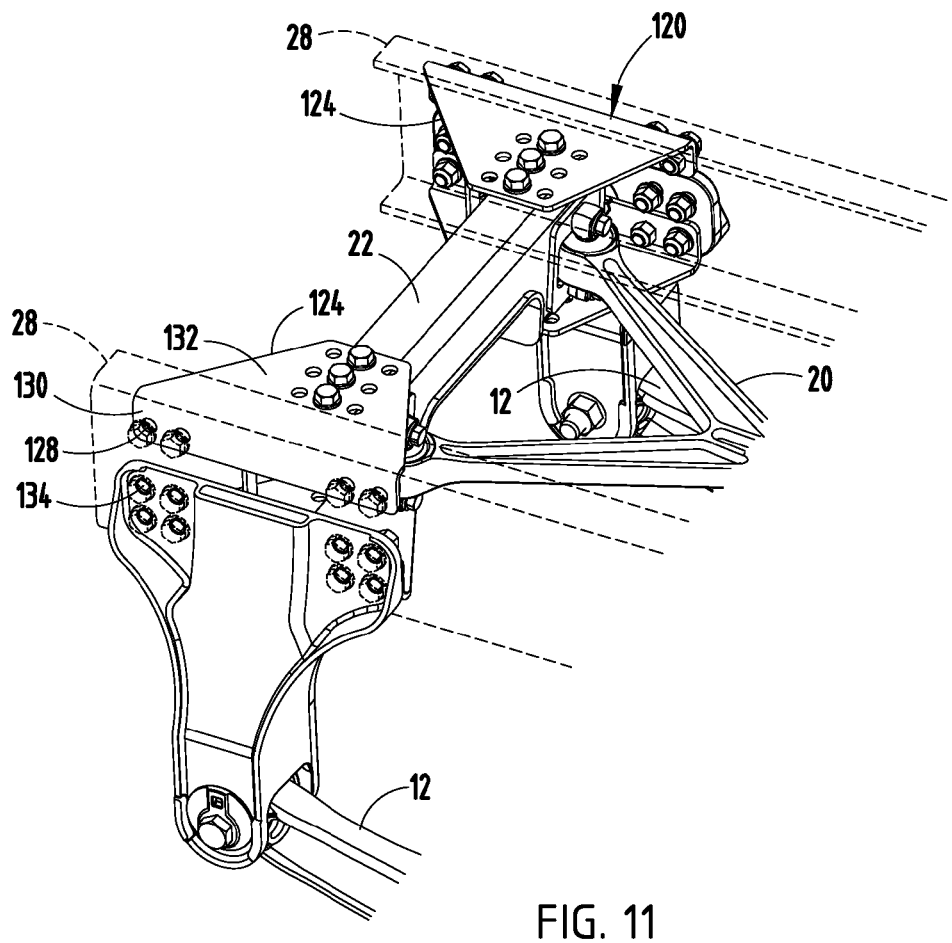
FIG. 11 is a perspective view of the frame cross member and includes a system of assembly holes that are used to adjust the pinion angle of the axle and a location of possible shims utilized therein.
Figure 12:
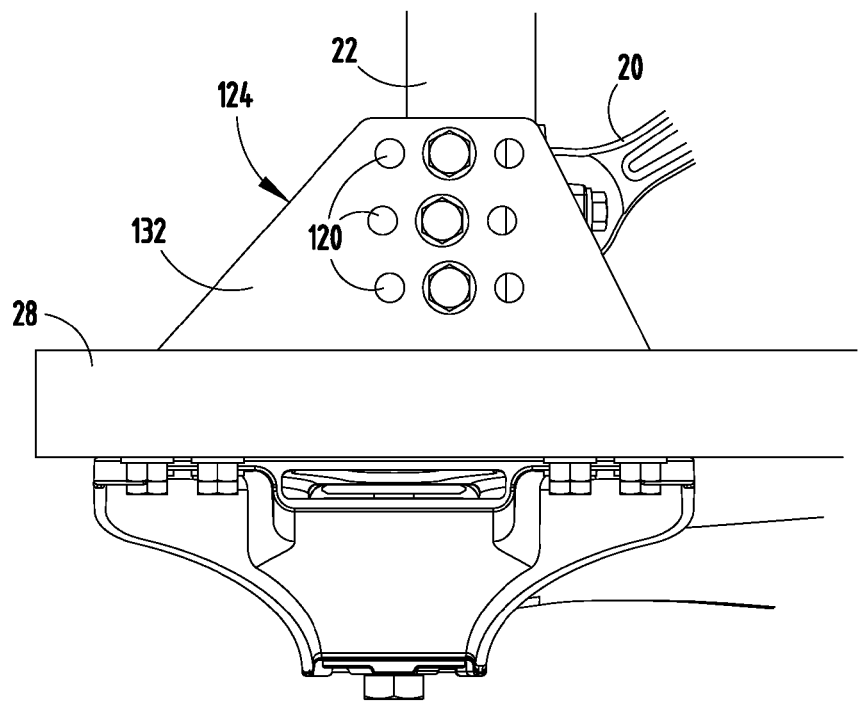
FIG. 12 is a detail perspective view of the frame cross member.

The vehicle frame cross member 22 (FIG. 5) comprises a steel material, and provides connection points for the forward end 102 of the v-rod 20 as well as strength and rigidity for the vehicle frame 28. In the illustrated example, the vehicle frame cross member 22 (FIG. 5a) is provided in a C-shaped cross-sectional configuration having a cut out section 110 in a lower flange 112 thereof to provide clearance for the vehicle drive line. The cut out 110 is reinforced by a C-shaped plate 115 (FIG. 5b) welded in place. Alternatively, the frame cross member may be constructed from a single, integral piece. The cross member 22 also includes cut out areas at each end to provide space for various wiring harnesses and air lines, and sets of three holes (not shown) on each of the lower and upper flanges 112, 114 (FIGS. 5A, 11 and 12) thereof to provide a connection point for the cross member end pieces 124. These sets of holes are arranged in a staggered pattern to error-proof assembly, thereby reducing the possibility of assembling the components in the wrong direction. The rear (vertical) face 116 of the center section 118 includes two attachment points for the v-rod 22, each attachment point consisting of two bolt holes matching the bar-pin bushings 104 on the v-rod 22 and a roughly square cut out 126 to provide clearance for the end of the v-rod 22. The rear face 116 of the center section 118 is canted at an angle from the vertical to provide a neutral angle for the bar-pin bushings 104, thereby reducing the required bushing articulation and increasing bushing life.

The cross member end pieces 124 (FIG. 11) comprise bent plates with four holes 128 in a short flange 130 thereof, and nine holes 120 in a long flange 132 thereof. The holes 128 in the short flange 130 are arranged to align with the holes 134 in the suspension frame bracket 26, thereby setting the fore/aft position of the cross member 22 relative to the suspension. The nine holes 120 in the long flanges 132 provide three possible positions to attach to the cross member center section 22, the selection of assembly holes providing incremental adjustments of five degrees in the axle pinion angle. The sets of holes 120 in the long section 132 are staggered to match the holes in the cross member center section 22. In an alternative embodiment, the sets of nine holes in the cross member end pieces are replaced by lateral slots to adjust the cross member assembly length for various vehicle applications. The length of the long flanges 132 is adjusted to provide cross member assemblies of varying length for various vehicle applications. Shims (not shown) may be added to the ends of the cross member 22 to adjust the overall length for various vehicle applications. Further, the center section of the cross member 22 may be varied in length for various vehicle applications.

In still another alternative embodiment, the sets of nine holes in the cross member end pieces are replaced by longitudinal slots to adjust for various axle pinion angles.

Figure 8:
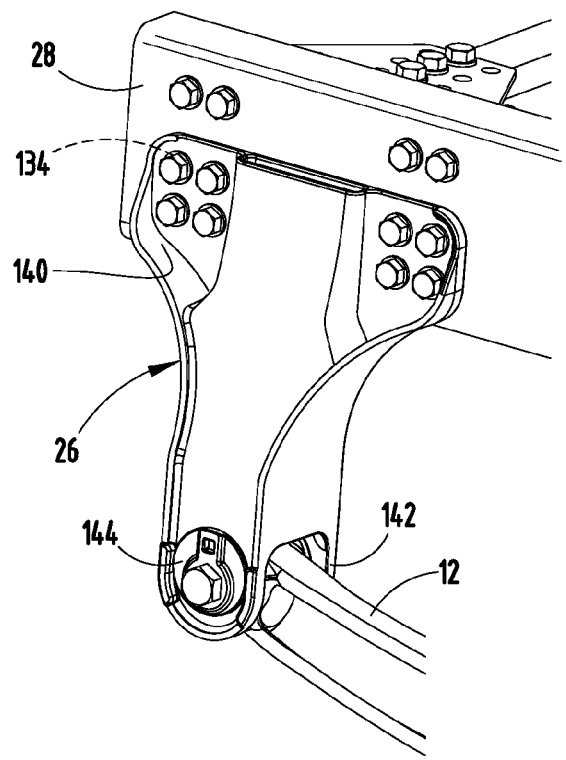
FIG. 8 is a perspective view of a frame attachment bracket that includes an eccentric, non-weld alignment system.

In the illustrated example, the suspension frame bracket 26 (FIG. 8) comprises a single piece casting which provides a connection between the lower control arms 12 and the vehicle frame 28. The relatively low profile of the top portion 140 provides clearance for other vehicle systems such as a fifth wheel. The lower end 142 forms a clevis which is clamped to the forward bushing 46 of the lower control arms 12 via a bolted connection.

Figure 18:
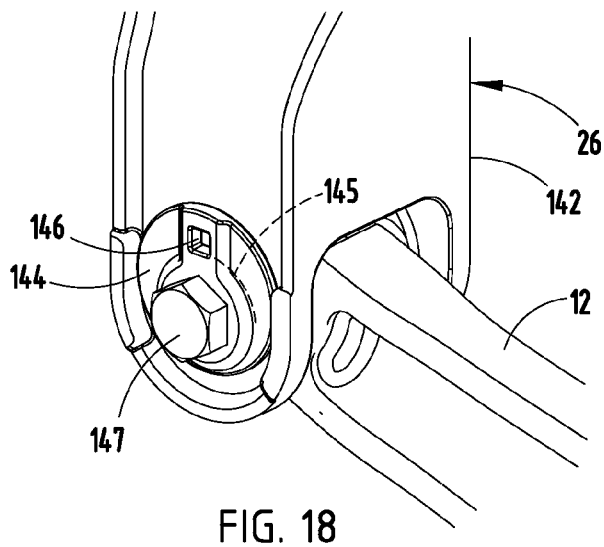
FIG. 18 is an enlarged perspective view of an adjustable frame bracket clevis including a slotted adjustable connection.

In one embodiment, the lower end 142 (FIG. 18) of the frame bracket 26 includes a pair of round holes (not shown) for the clamped connection while the other has a pair of slots (not shown) which allow an adjustable connection. The bracket 26 with the slotted clevis also includes a round alignment puck 144 with an off center round hole (not shown) which mates to a recess 155 on the frame bracket 26. Rotating the puck 144 causes the off center hole to travel forward or rearward providing a means of aligning the vehicle axle 18. The puck 144 is rotated by inserting a standard socket wrench handle into a square hole 146 and applying a torque. The puck 144 is held in its final position by the clamp load imposed by the torque on the pivot bolt 147.

Figure 19:
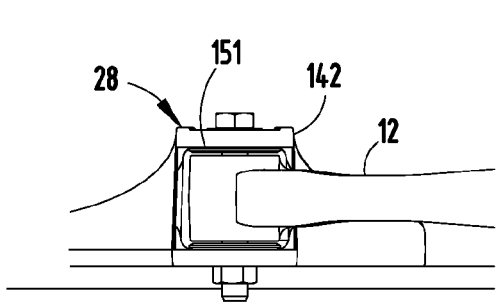
FIG. 19 is an enlarged bottom plan view of the frame bracket and lower control arm assembly and including the washers that may be moved to adjust for various frame widths.

The frame brackets 28 (FIG. 19) may be used with various vehicle frame widths and a fixed lower control arm assemblies of various widths. This is accomplished by placing a pair of washers 151 either one per side or both on either the inboard or outboard side.

Figure 9:
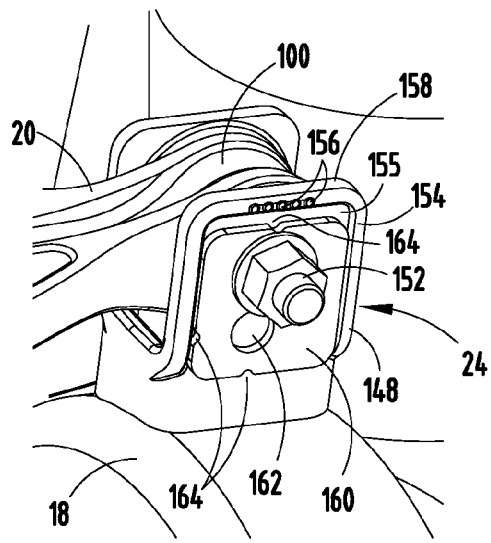
FIG. 9 is a perspective view of the v-rod bracket that includes a system of holes that are used to adjust a pinion angle of an axle.
Figure 10:
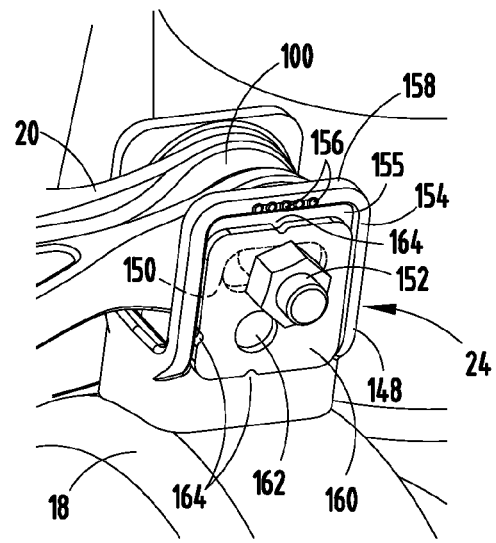
FIG. 10 is a perspective view of the v-rod bracket with a pinion plate.

The v-rod 20 (FIGS. 5, 9 and 10) is connected to the axle 18 via the v-rod axle bracket 24. The bracket 24 comprises a cast part which is welded to the upper surface of the axle 18, and provides a clevis 148 which is clamped onto the through bolt bushing 106 in the rear most end 100 of the v-rod 20 entrapping a pair of spacing washers 153 (FIG. 17). The bracket 24 has a pair of slots 150 which allows the through bolt 152 to clamp at a variety of positions, a ridge 154 extend about a periphery of the bracket forming a square recess 155, and a series of detents 156 along a top edge 158 of the ridge 154.

The clamp joint includes a pair of square pinion plates 160 each having one or more off center holes 162 for the through bolt bushing bolt 152 and are clamped into the square recess 155 on the bracket casting 24. On the edges of the pinion plate 160 are notches 164, the notches 164 being aligned in various positions with the detents 156 on the bracket casting 24 to create incremental, one degree, adjustments of the axle pinion angle.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:
1. A vehicle suspension system, comprising:
a first trailing arm assembly, comprising:
   a first mounting bracket adapted to be secured to a vehicle frame; and
   a first trailing arm member pivotably coupled to the first mounting bracket and adapted to be operably coupled to an axle member;
a second trailing arm assembly, comprising:
   a second mounting bracket adapted to be secured to a vehicle frame; and
   a second trailing arm member pivotably coupled to the second mounting bracket and adapted to be operably coupled to an axle member; and
a torsional member extending between the first trailing arm member and the second trailing arm member and secured to the first trailing arm member and the second trailing arm member, wherein the torsional member includes a substantially oval-shaped cross-sectional configuration, and wherein the torsional member includes a pair of substantially flat portions extending along a length of the torsional member, and a pair of substantially arcuate portions extending along a length of the torsional member and interspaced with the substantially flat portions.

2. The vehicle suspension system of claim 1, wherein the torsional member is secured to the first trailing arm member and the second trailing arm member via a frictional securement.

3. The vehicle suspension system of claim 2, wherein the frictional securement of the torsional member with the first and second trailing arm members is not supplemented by other means of securement.

4. The vehicle suspension of claim 1, wherein the torsional member is press-fit into securement with the first and second trailing arm members.

5. A vehicle suspension system, comprising:
   a first mounting bracket adapted to be secured to a vehicle frame;
   a trailing arm member pivotably coupled to the first mounting bracket and adapted to be operably coupled to an axle member;
   a torsional member operably coupled to the trailing arm member;
   a spring assembly adapted to operably support a vehicle frame from the trailing arm; and
   a spring assembly mount including a first portion having an aperture therein that receives the torsional member therethrough, and a second portion coupled to the first portion and adapted to support the spring assembly thereon, wherein the first portion and the second portion of the spring assembly mount is a single, integral piece.

6. The vehicle suspension system of claim 5, wherein the spring assembly mount is slip-fit over an end of the torsional member.

7. A vehicle suspension system, comprising:
   a first trailing arm assembly, comprising:
      a first mounting bracket adapted to be secured to a vehicle frame; and
      a first trailing arm member includes a first end, a second end and an intermediate location located between the first end and the second end, wherein the first trailing arm member is pivotably coupled to the first mounting bracket at the first end of the first trailing arm, the first trailing arm member is adapted to be operably coupled to an axle member, and wherein a cross-sectional area of the trailing arm member at a position proximate the first end is less than a cross-section area of the trailing arm member at a position proximate the intermediate location;
   a second trailing arm assembly, comprising:
      a second mounting bracket adapted to be secured to a vehicle frame; and
      a second trailing arm member includes a first end, a second end and an intermediate location located between the first end and the second end, wherein the second trailing arm member is pivotably coupled to the second mounting bracket at the first end of the second trailing arm, the second trailing arm member is adapted to be operably coupled to an axle member, and wherein a cross-sectional area of the second trailing arm member at a position proximate the first end of the second trailing arm member is less than a cross-sectional area of the second trailing arm member at a position proximate the intermediate location of the second trailing arm member; and
   a torsional member extending between the first trailing arm member and the second trailing arm member and secured to the first and second trailing arm members, and wherein the torsional member includes a substantially oval-shaped cross-sectional configuration, wherein the torsional member includes a pair of substantially flat portions extending along a length of the torsional member, and a pair of substantially arcuate portions extending along a length of the torsional member and interspaced with the substantially flat portions.

8. The vehicle suspension system of claim 7, wherein the torsional member is secured to the first and second trailing arm members by a frictional securement.

9. The vehicle suspension system of claim 7, wherein the torsional member is press-fit into a first aperture located in the first trailing arm member, and a second aperture located in the second trailing arm member.

* * * * *